United States Patent
Wright et al.

(10) Patent No.: US 10,167,768 B2
(45) Date of Patent: Jan. 1, 2019

(54) HEAT EXCHANGER WITH REPLACEMENT PIN

(71) Applicant: DENSO International America, Inc., Southfield, MI (US)

(72) Inventors: Jacob Wright, Royal Oak, MI (US); Michael Wojdyla, Sterling Heights, MI (US); Michael Lacey, Allen Park, MI (US)

(73) Assignee: DENSO International America, Inc., Southfield, MI (US)

( * ) Notice: Subject to any disclaimer, the term of this patent is extended or adjusted under 35 U.S.C. 154(b) by 207 days.

(21) Appl. No.: 14/840,464

(22) Filed: Aug. 31, 2015

(65) Prior Publication Data

US 2017/0058752 A1   Mar. 2, 2017

(51) Int. Cl.
| | | |
|---|---|---|
| *F28F 9/00* | (2006.01) | |
| *F28D 1/00* | (2006.01) | |
| *B60K 11/04* | (2006.01) | |
| *F01P 3/18* | (2006.01) | |
| *F28D 1/053* | (2006.01) | |
| *F28D 21/00* | (2006.01) | |

(52) U.S. Cl.
CPC .............. *F01P 3/18* (2013.01); *B60K 11/04* (2013.01); *F28D 1/05366* (2013.01); *F28F 9/002* (2013.01); *F28D 2021/0094* (2013.01); *F28F 2275/20* (2013.01)

(58) Field of Classification Search
CPC ........ F01P 3/18; B60K 11/04; F28D 1/05366; F28F 9/001; F28F 9/002; F28F 9/00; F28F 2280/06

USPC .................................................. 165/67, 149
See application file for complete search history.

(56) References Cited

U.S. PATENT DOCUMENTS

| | | | | |
|---|---|---|---|---|
| 1,485,178 | A * | 2/1924 | Frank ...................... | F24D 19/02 165/67 |
| 2,065,515 | A * | 12/1936 | Cornell, Jr. ............... | F28F 1/28 165/144 |
| 3,340,948 | A * | 9/1967 | Franz ..................... | B60K 11/04 180/68.4 |
| 4,303,052 | A * | 12/1981 | Manfredo ................. | F01P 3/18 123/563 |
| 4,979,559 | A * | 12/1990 | Dennis .................... | F24F 13/32 165/67 |
| 5,078,224 | A * | 1/1992 | Attinger ................. | B60K 11/04 165/67 |
| 5,613,550 | A * | 3/1997 | Ashida .................... | F28F 9/002 165/173 |
| 6,364,403 | B1 * | 4/2002 | Ozawa .................. | B60K 11/04 296/187.09 |
| 2004/0089769 | A1* | 5/2004 | Carrier ................... | B60K 11/04 248/71 |

(Continued)

FOREIGN PATENT DOCUMENTS

| | | | |
|---|---|---|---|
| EP | 0870638 A1 | 10/1998 | |
| EP | 1205332 A1 | 5/2002 | |
| WO | WO 2014124847 A1 * | 8/2014 | ............. B60K 11/04 |

*Primary Examiner* — Jason Thompson
(74) *Attorney, Agent, or Firm* — Harness, Dickey & Pierce, P.L.C.

(57) ABSTRACT

A heat exchanger includes a core and a tank. The tank is equipped to a side of the core. The tank has a pocket, which is a space having an opening. The pocket is configured to receive a nut through the opening and to accommodate the nut.

7 Claims, 12 Drawing Sheets

LENGTH (VERTICAL)
WIDTH (LATERAL)

(56) References Cited

U.S. PATENT DOCUMENTS

| | | | | |
|---|---|---|---|---|
| 2006/0081363 A1* | 4/2006 | Chissus | ............. | F28D 1/0435 |
| | | | | 165/173 |
| 2010/0078149 A1* | 4/2010 | Yoshimitsu | ............ | B60K 11/04 |
| | | | | 165/67 |
| 2012/0247849 A1* | 10/2012 | Ogawa | ................. | B60K 11/04 |
| | | | | 180/68.4 |
| 2012/0328390 A1* | 12/2012 | Colpan | ................ | F25B 39/04 |
| | | | | 411/166 |

\* cited by examiner

HEAT EXCHANGER WITH REPLACEMENT PIN

TECHNICAL FIELD

The present disclosure relates to a heat exchanger having a replaceable pin.

BACKGROUND

A heat exchanger may have an attachment pin for installation of the heat exchanger to an object such as a vehicle. An attachment pin may be extended from, for example, a tank and may be desirable to facilitate replacement of the attachment pin in case of breakage.

SUMMARY

According to an aspect of the disclosure, a tank may be equipped to a side of a core of a heat exchanger. The tank may have a pocket, which is a space having an opening. The pocket may be configured to receive a nut through the opening and to accommodate the nut.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

As follows, a first embodiment of the present disclosure will be described with reference to drawings. In the description, a vertical direction is along an arrow represented by "VERTICAL" in drawing(s). A length direction is along an arrow represented by "LENGTH" in drawing(s). A width direction is along an arrow represented by "WIDTH" in drawing(s). A lateral direction is along an arrow represented by "LATERAL" in drawing(s).

Figure 1:
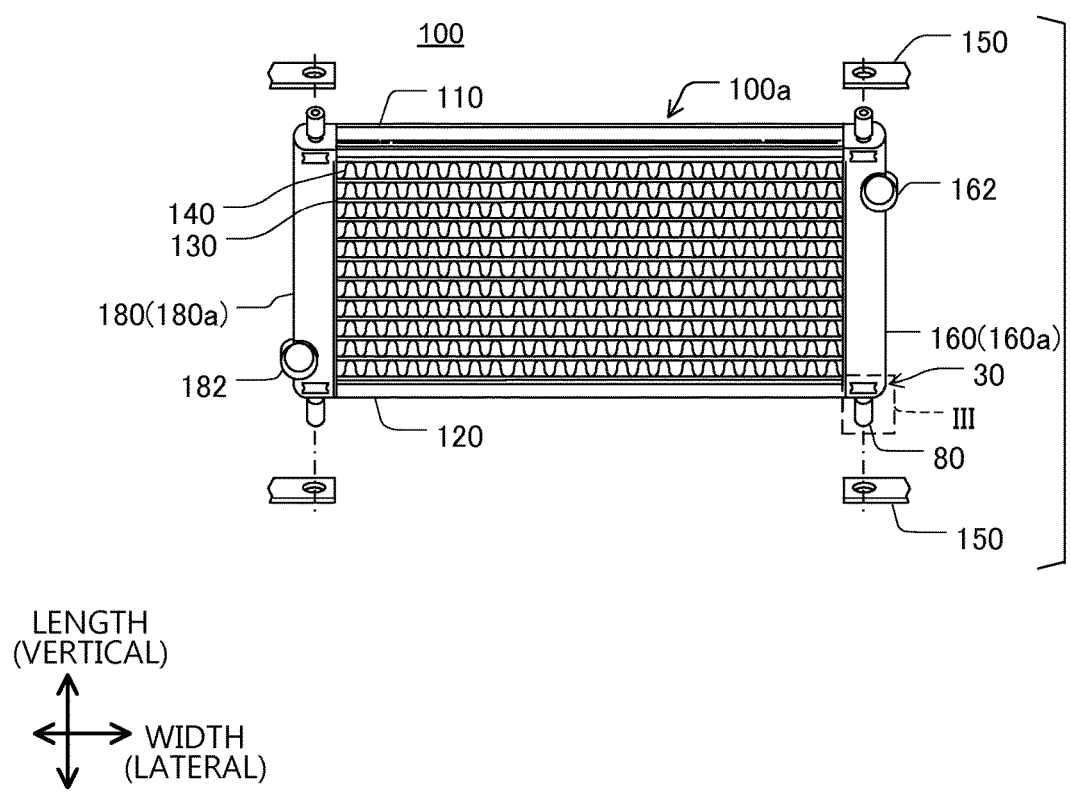
FIG. 1 is a perspective view showing a radiator.

As shown in FIG. 1, a radiator 100 (heat exchanger) includes tanks (tank bodies) 160 and 180, multiple tubes 130, multiple fins 140, and plates 110 and 120. The tanks 160 and 180, the tubes 130, the fins 140, and the plates 110 and 120 are integrated with each other and may be brazed into one component. The tanks 160 and 180 may be crimped to a core 100a formed of the tubes 130 and the fins 140. The radiator 100 may be connected with an internal combustion engine through an inlet 162 and an outlet 182 and unillustrated pipes to circulate cooling water therethrough. The tubes 130 and the fins 140 may be stacked alternately in the vertical direction to form the core 100a. The alternately stacked tubes 130 and fins 140 may be interposed between the tank 160 and 180 at both ends.

Each of the fins 140 may be extended in the lateral direction and may be interposed between adjacent tubes 130 in the vertical direction. The fin 140 and the adjacent tubes 130 may form air passages to flow air therethrough. The fins 140 may enhance a performance of heat exchange between the cooling water (thermal medium), which flows through the tubes 130, with air, which passes through the air passages.

One ends of the tubes 130 may be inserted into the tank 160 and communicated with an internal space 160a formed in the tank 160. The other ends of the tubes 130 may be inserted into the tank 180 and communicated with an internal space 180a formed in the tank 180. Thus, the tank 160, the tubes 130, and the tank 180 may form a fluid passage to flow the thermal medium therethrough. Inserts plates 110 and 120 may be equipped to one sides (core sides) of the core 100a, respectively, to reinforce the core 100a. The tanks 160 and 180 may be equipped to the other sides (tank sides) of the core 100a.

As shown in FIG. 1, each of the tanks 160 and 180 has pockets 30 and pins 80 on both an upper side and a lower side in the vertical direction. The pins 80 are protruded from an upper end and a bottom end of the tank. The pins 80 are inserted through holes of brackets 150, respectively. Thus, the radiator 100 is affixed to an object such as a frame of a vehicle via the brackets 150.

The tanks 160 and 180 may have similar structures. In the following description, one bottom portion of the tank 160 in the vertical direction will be described as a representative example. The structure of the one bottom portion of the tank 160 may be applied the bottom portion of the tank 180 and to upper portions of the tanks 160 and 180.

Figure 2:
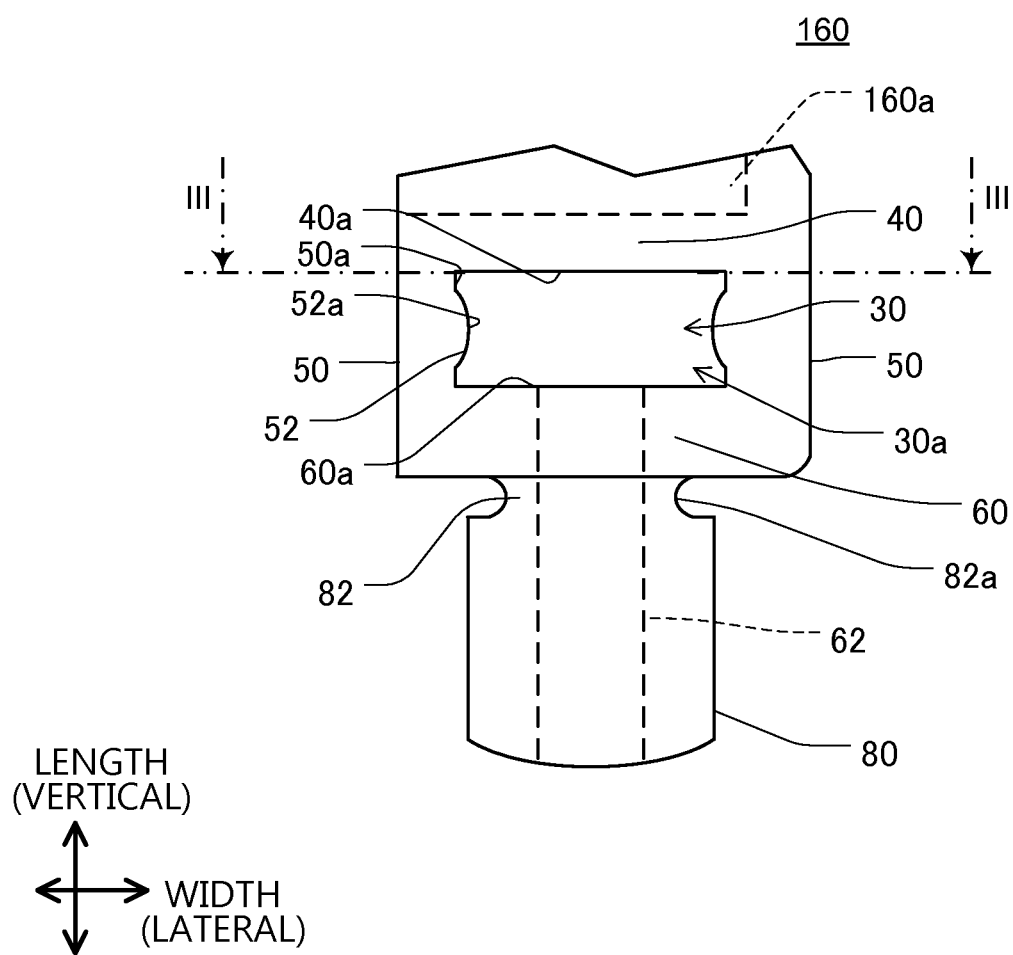
FIG. 2 is a side view showing a pocket and a pin of a tank of the radiator.
Figure 3:
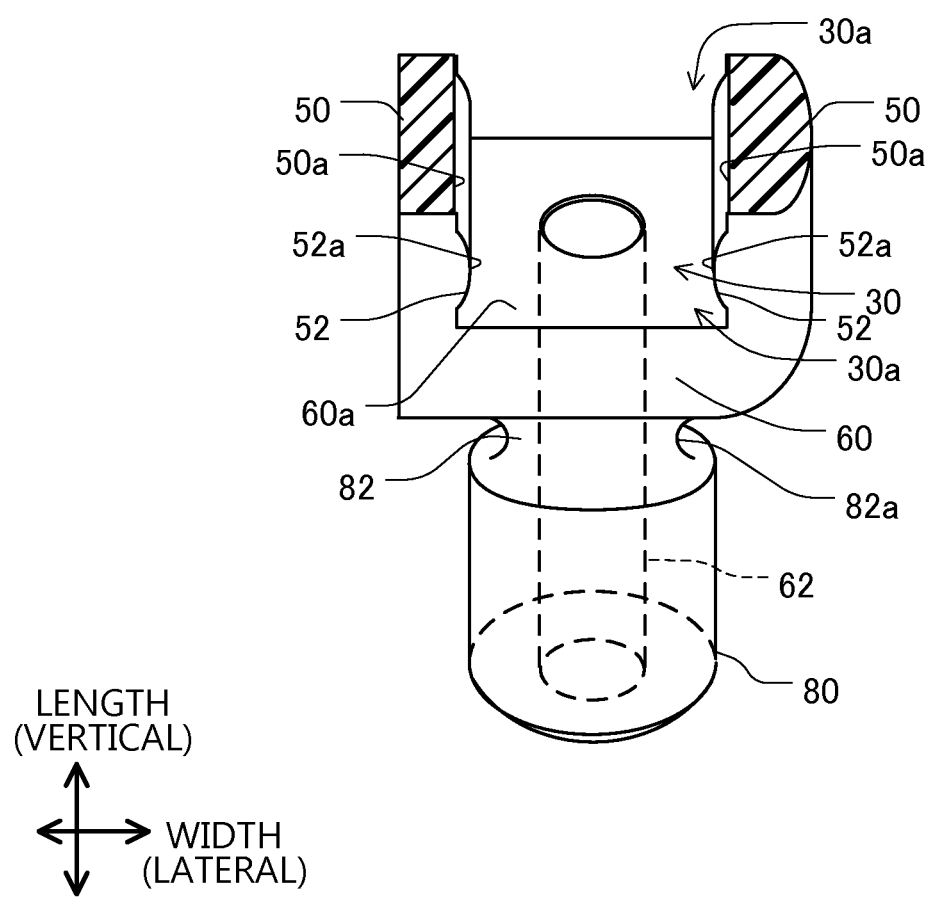
FIG. 3 is a partial sectional perspective view showing the pocket and the pin.

As shown in FIGS. 2 and 3, the tank 160 may form the internal space 160a therein. The tank 160 may have a partition wall 40, sidewalls 50, and a bottom wall 60, which may form the pocket 30. The partition wall 40 may partition the axial section of the tank 160, which is perpendicular to an axis of the tank 160, to partition the internal space 160a from the pocket 30. The bottom wall 60 may partition the pocket 30 from the pin 80. The sidewalls 50 may connect the partition wall 40 with the bottom wall 60.

The pocket 30 may be a box-shaped space having openings 30a. In the example, the pocket 30 may be a rectangular through hole extending through the tank 160 between two openings 30a. The pocket 30 may be defined by a top surface 40a of the partition wall 40, side surfaces 50a of the side wall 50, and a bottom surface 60a of the bottom wall 60. Each of the top surface 40a and the bottom surface 60a may be a flat surface. In the example, the side surfaces 50a have protrusions 52, respectively, protruded into the pocket 30. Therefore, the pocket 30 may have a rectangular cross section dented at the protrusions 52.

The pin 80 may be in a tubular shape and extended from the bottom wall 60 to the outside of the tank 160. A through hole 62 may extend through the bottom wall 60 and the pin 80 in an axial direction and may communicate with the pocket 30. The pin 80 may have a root 82 on the side of the bottom wall 60. The root 82 may have a notch 82a on the radially outside. The pin 80 may be reduced in diameter at the root 82 by forming the notch 82a. The root 82 and the notch 82a may function as a breakable portion to concentrate a stress and to cause fracture at the root 82.

The tank 160 and the pin 80 may be integrally molded of resin such as ABS all together. Specifically, the through hole 62 may be formed by using a slidable core movable in the axial direction of the through hole 62 relative to molding dies of the tank 160. The pocket 30 may be formed by using a slidable core movable relative to the molding dies of the tank 160 in a direction to pass through the openings 30a of the pocket 30.

Figure 4:
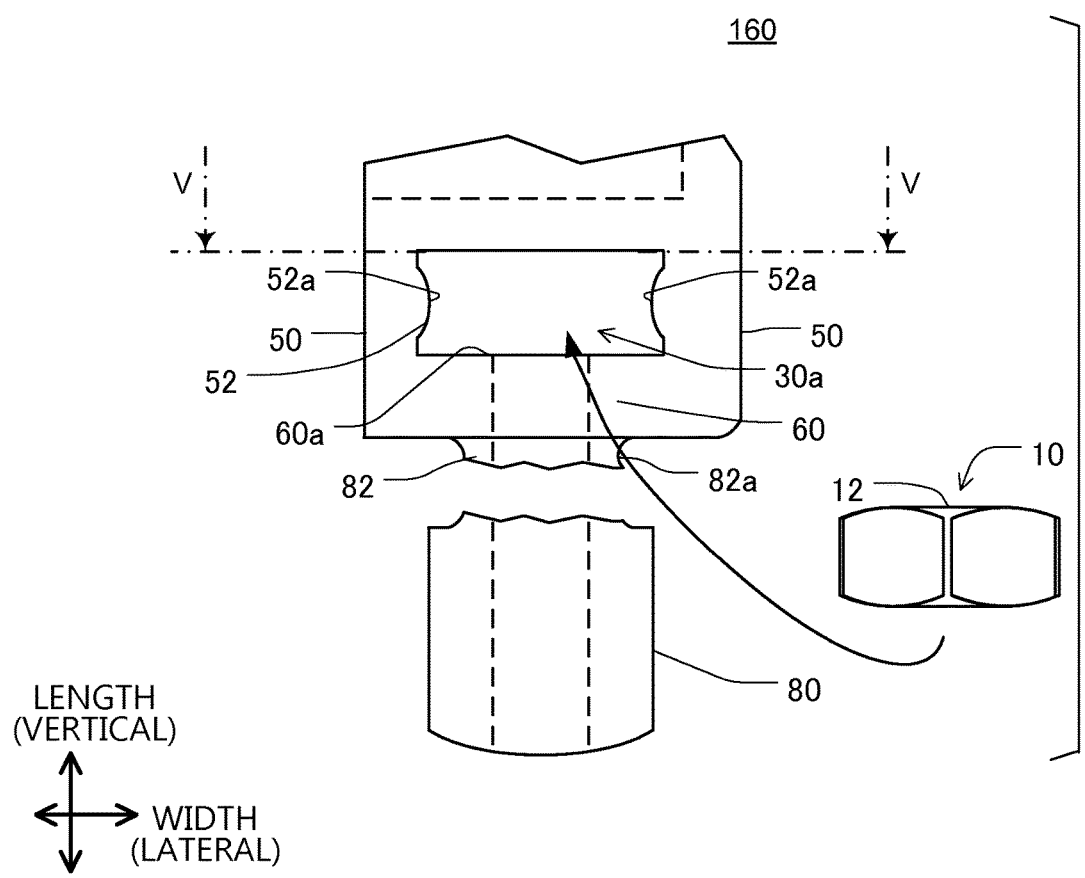
FIG. 4 is a side view showing the pocket and the pin removed from the tank.
Figure 5:
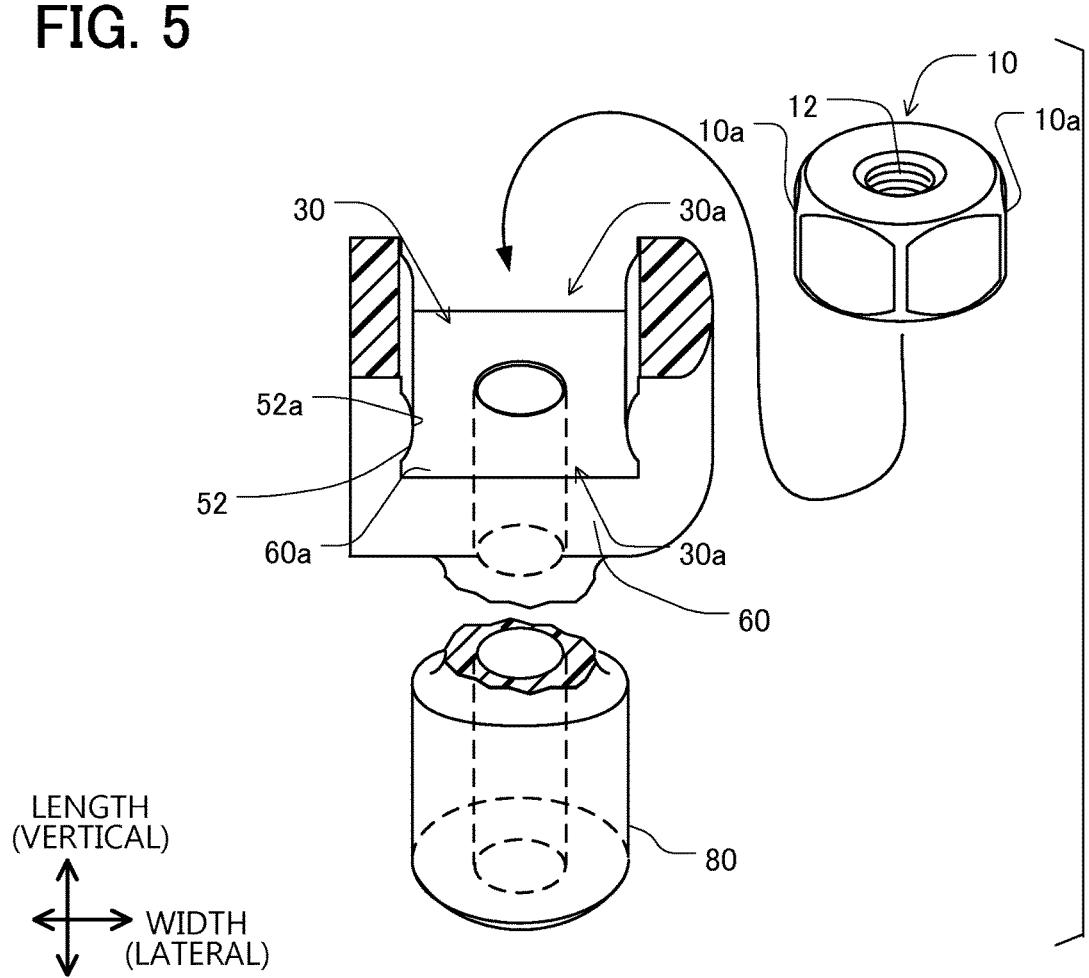
FIG. 5 is a partial sectional perspective view showing the pocket and the pin removed from the tank.

Assuming an abnormality such as traffic accident of the vehicle, the frame of the vehicle may largely deform to displace its position relative to the brackets 150. The large displacement of the brackets 150 may exert excessive stress onto the pin 80. Consequently, as shown in FIGS. 4 and 5, the pin 80 may cause fracture at the root 82 and may break away from the tank 160 thereby to protect the tank 160 and the core 100a from application of excessive stress. Consequently, the radiator 100 may be brought to a service shop to be repaired. As follows, a process to replace the pin 80 will be described.

First, a nut 10 may be inserted into the pocket 30. In the example, the nut 10 may be a hexagonal nut. The nut 10 may be a widely distributed mechanical component having a center thread 12. The center thread 12 may be a meter screw thread or an inch screw thread. The nut 10 may comply with an industrial standard such as American Society for Tool and Manufacturing Engineers (ASTM) or Japanese Industrial Standard (JIS). The nut 10 may be formed of metal and/or resin.

The pocket 30 may have a dimension such that the nut 10 is fitted to the pocket 30. Specifically, the height of the pocket 30 between the top surface 40a and the bottom surface 60a may be the same or slightly less than the height of the nut 10 thereby to enable frictional fitting of the nut 10. The height of the pocket 30 may be the greater than the height of the nut 10 thereby to enable loose fitting of the nut 10.

The width of the pocket 30 between peak surfaces 52a of the protrusions 52 may be the same or slightly less than a width of the nut 10, which is the distance between opposed two parallel nut surfaces 10a of the nut 10, thereby to enable frictional fitting of the nut 10. The width of the pocket 30 may be the greater than the width of the nut 10 thereby to enable loose fitting of the nut 10. In the example, the peak surface 52a may have an arch shape and may reduce contact area with the nut surface 10a of the nut 10. The nut 10 may be inserted though one of the openings 30a into the pocket 30 and retained in the pocket 30. The center thread 12 of the nut 10 may be aligned with the through hole 62 of the bottom wall 60 to be coaxial with each other.

Figure 6:
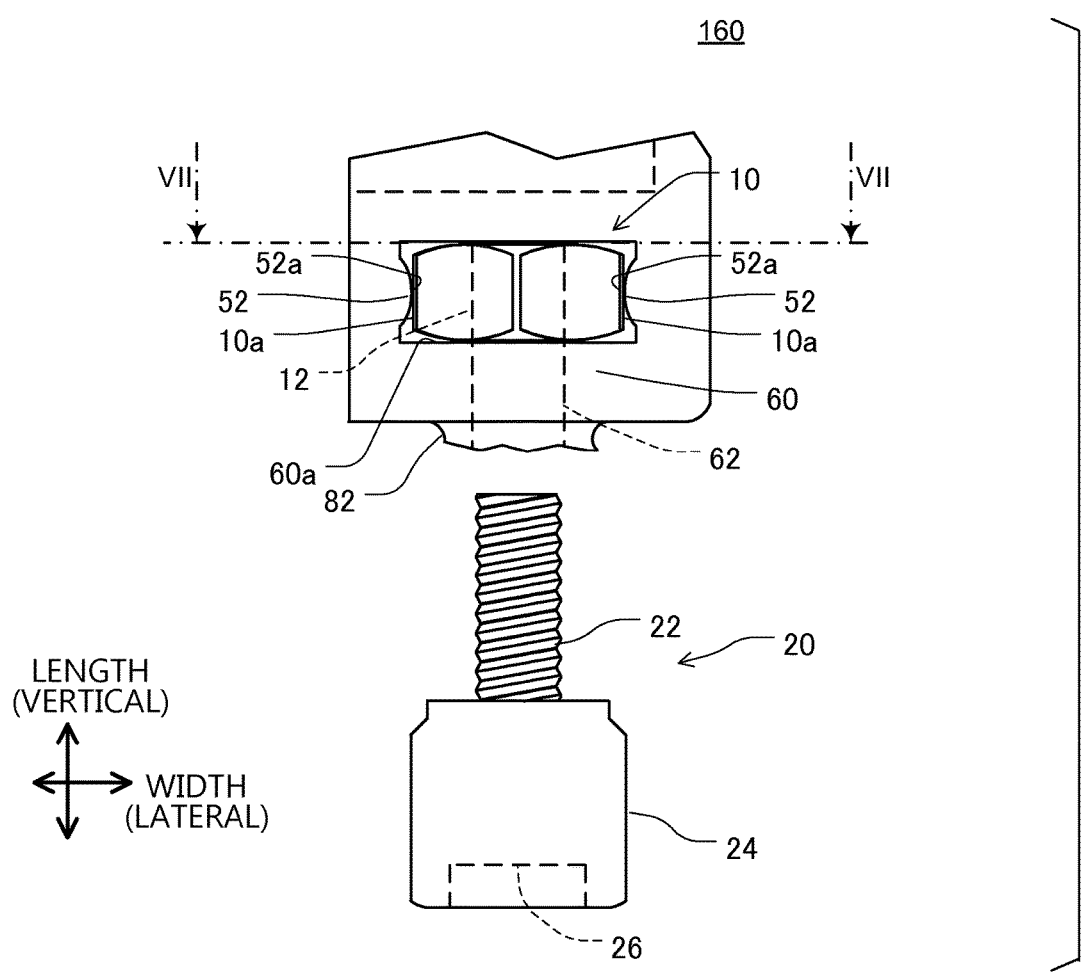
FIG. 6 is a side view showing a nut in the pocket and a bolt.
Figure 7:
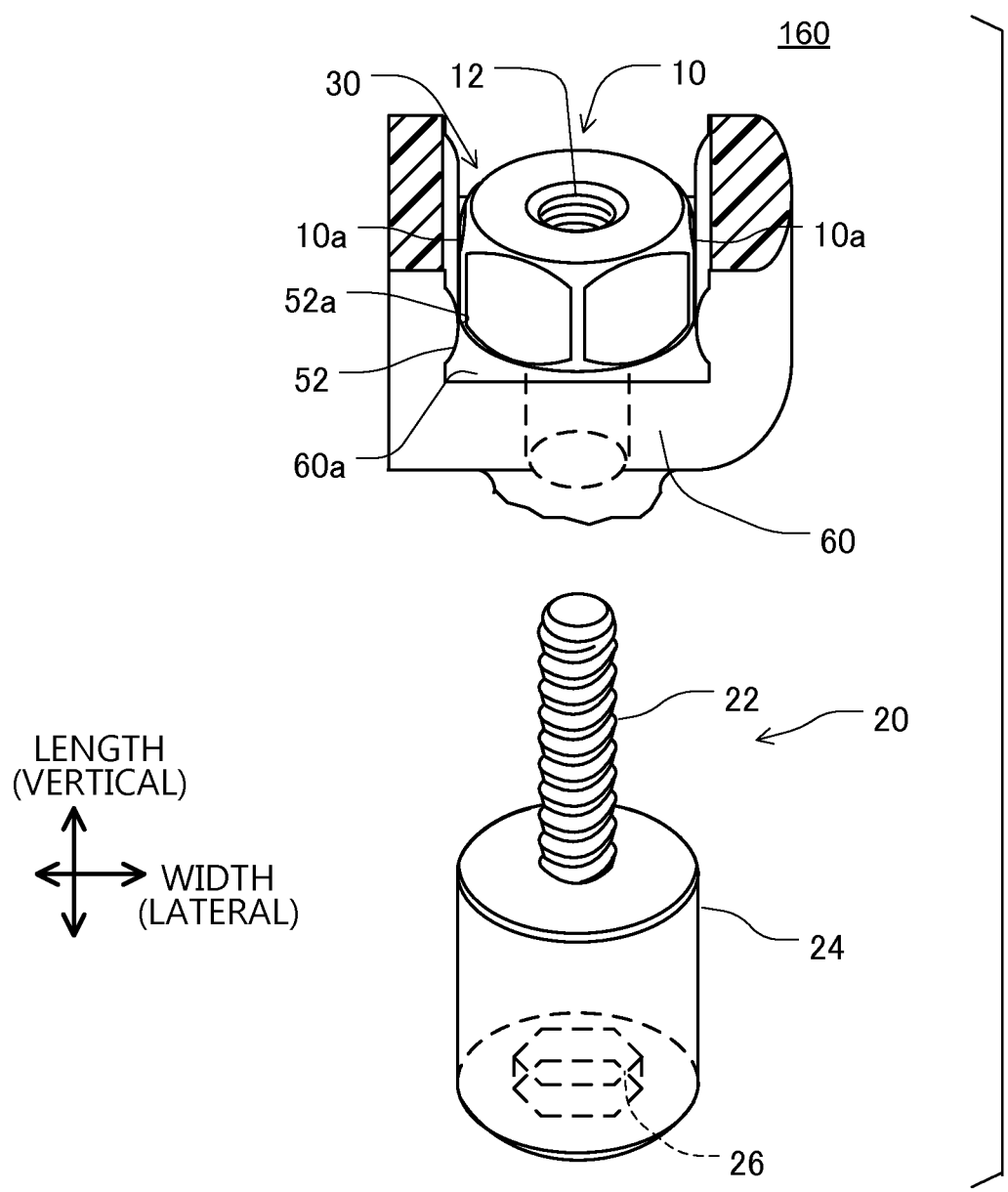
FIG. 7 is a partial sectional perspective view showing the nut in the pocket and the bolt.

Subsequently, as shown in FIGS. 6 and 7, a bolt 20 is inserted into the through hole 62 of the bottom wall 60 and is screwed into the center thread 12 of the nut 10 by using, for example, a wrench affixed to the hex key 26.

The bolt 20 may be a widely distributed mechanical component having a male thread 22. The male thread 22 may be a meter screw thread or an inch screw thread. The bolt 20 may comply with industrial standard such as ASTEM or JIS.

The bolt 20 may be formed of metal and/or resin. The male thread 22 of the bolt 20 may be screwable into the center thread 12 of the nut 10. That is, the bolt 20 may be selected to match the nut 10. The bolt 20 and the nut 10 may be paired together as a service kit and may be distributed to service shops. In the example, the bolt 20 may be a hex-key bolt having a bolt head 24 defining a hex key 26. The bolt head 24 may have a length and a width to function as a replacement of the pin 80.

The through hole 62 of the bottom wall 60 may have a diameter greater than the diameter of the male thread 22 of the bolt 20. Therefore, the through hole 62 may enable the male thread 22 of the bolt 20 to pass loosely therethrough. First, the male thread 22 of the bolt 20 may be loosely inserted through the through hole 62 of the bottom wall 60. Subsequently, the male thread 22 may be screwed into the center thread 12 of the nut 10. In the state, the nut surfaces 10a of the nut 10 may be in contact with and may be supported by the protrusions 52 of the pocket 30, respectively, thereby unable to rotate within the pocket 30. Thus, the nut 10 supported in the pocket 30 may function as a female thread integrated with the tank 160.

The bolt 20 may be further screwed into the nut 10 until a tip end of the male thread 22 makes contact with the top surface 40a of the pocket 30. The screwing force may urge the nut 10 onto the bottom surface 60a of the pocket 30 thereby to tighten the nut 10 onto the bottom wall 60. Thus, the bolt 20, the nut 10, and the tank 160 may be tightly affixed all together. Alternatively, the bolt 20 may be screwed into the nut 10 until the bolt head 24 makes contact with the broken end of the root 82. In this case, the screwing force may urge the bolt head 24 onto the broken end of the root 82 to enable the bolt 20 and the nut 10 to be tightly affixed to the tank 160.

Figure 8:
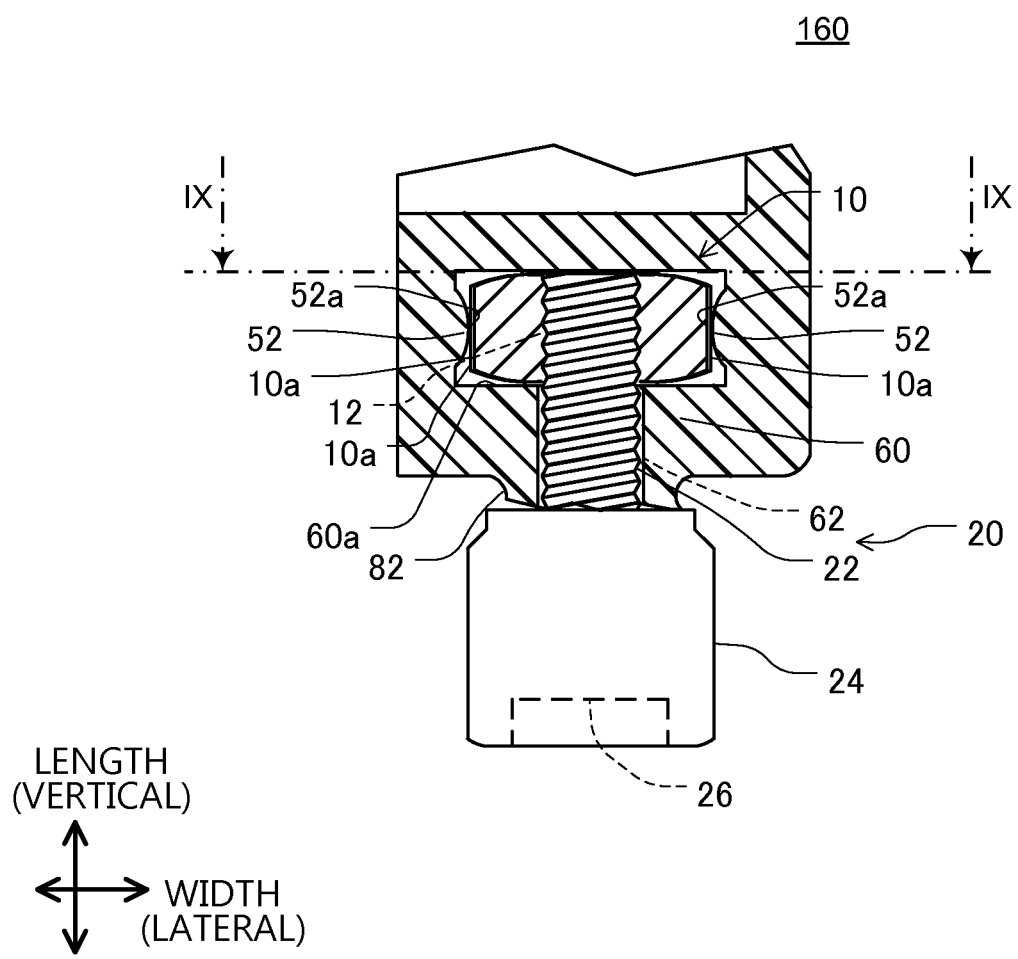
FIG. 8 is a partial sectional view showing the bolt screwed in the nut.
Figure 9:
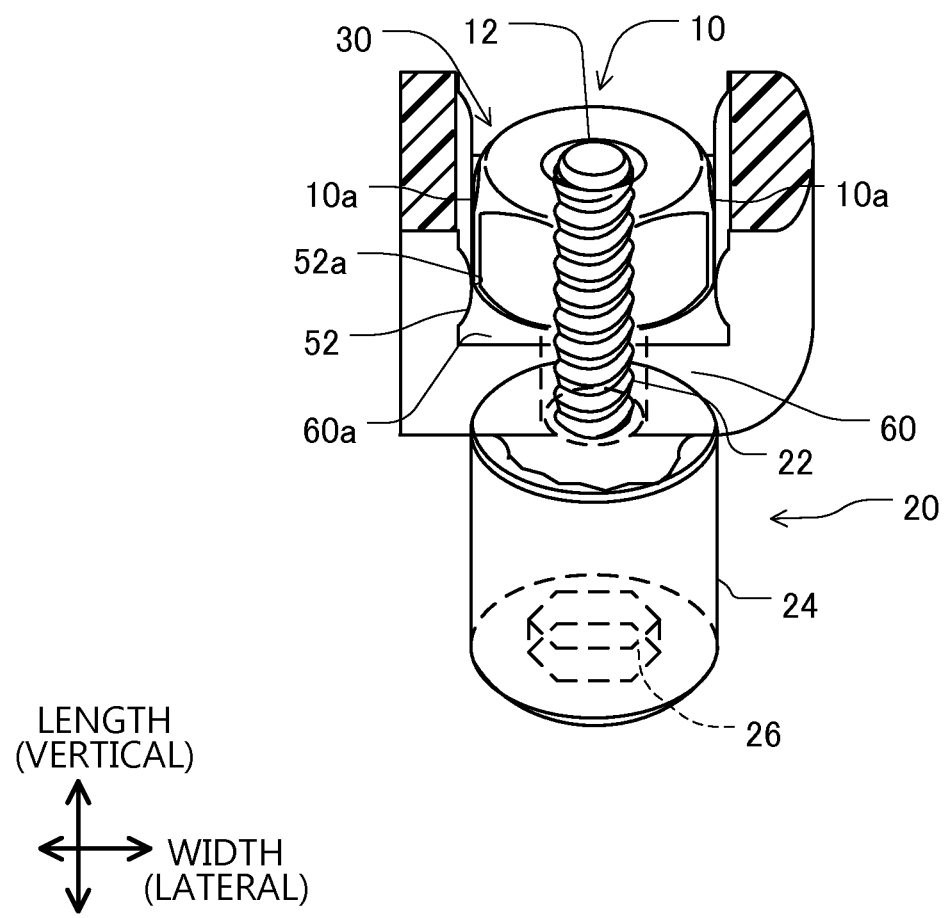
FIG. 9 is a partial sectional perspective view showing the bolt screwed in the nut.

Thus, as shown in FIGS. 8 and 9, the bolt 20 is affixed to the tank 160 such that the bolt head 24 is protruded from the bottom wall 60 of the tank 160. The bolt 20 may be rigidly integrated with the tank 160 to function as a substitute of the pin 80.

The nut 10 and the bolt 20 may be still replaceable. In a case where the vehicle experiences accident again, and if the nut 10 and/or the bolt 20 are broken, the nut 10 and/or the bolt 20 may be replaced with new component(s).

Before the pin 80 is replaced with the bolt 20, the broken portion (root 82) of the pin 80 may be ground by using a tool, such as a grinder or a sandpaper, to form a flat surface to be mated to the bolt head 24 of the bolt 20.

Second Embodiment

Figure 10:
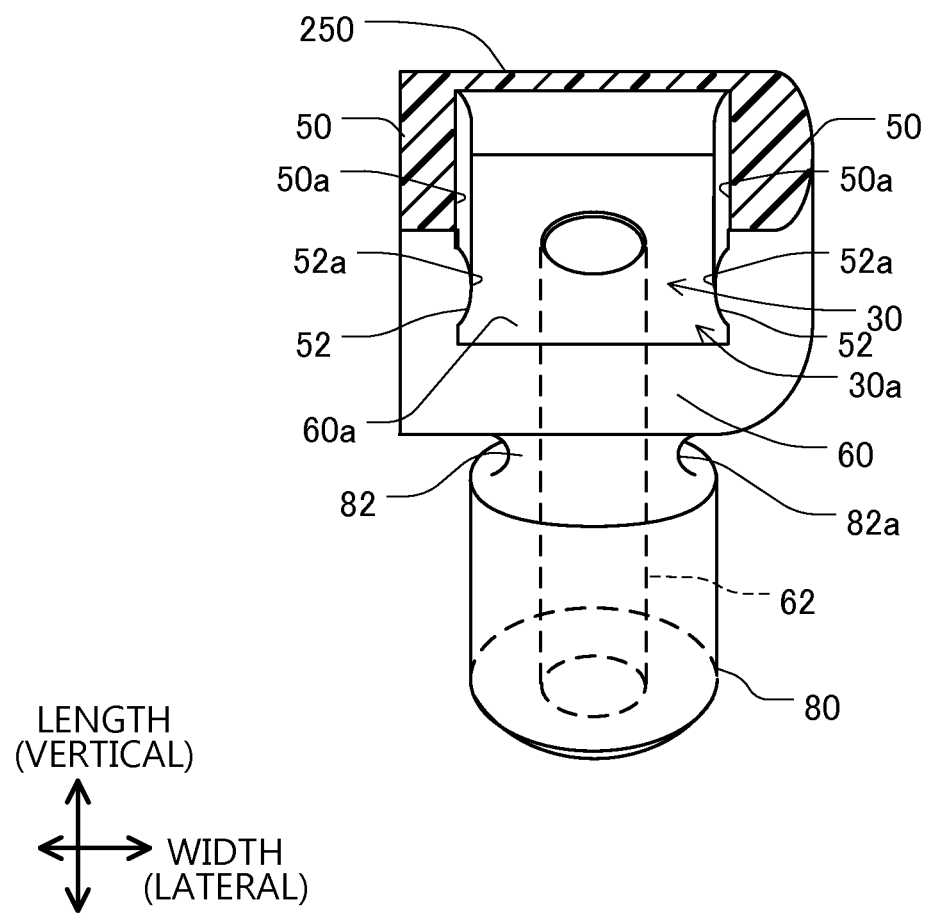
FIG. 10 is a partial sectional perspective view showing a pocket of a second embodiment.

As shown in FIG. 10, in the present example, one opening 30a of the pocket 30 may be closed with an end wall 250. The nut 10 may be inserted into the pocket 30 through the remaining one opening 30a. The end wall 250 may retain the nut 10 within the pocket 30 not to be dropped off the pocket 30. The end wall 250 may function as a rigid body together with the tank 160.

Third Embodiment

Figure 11:
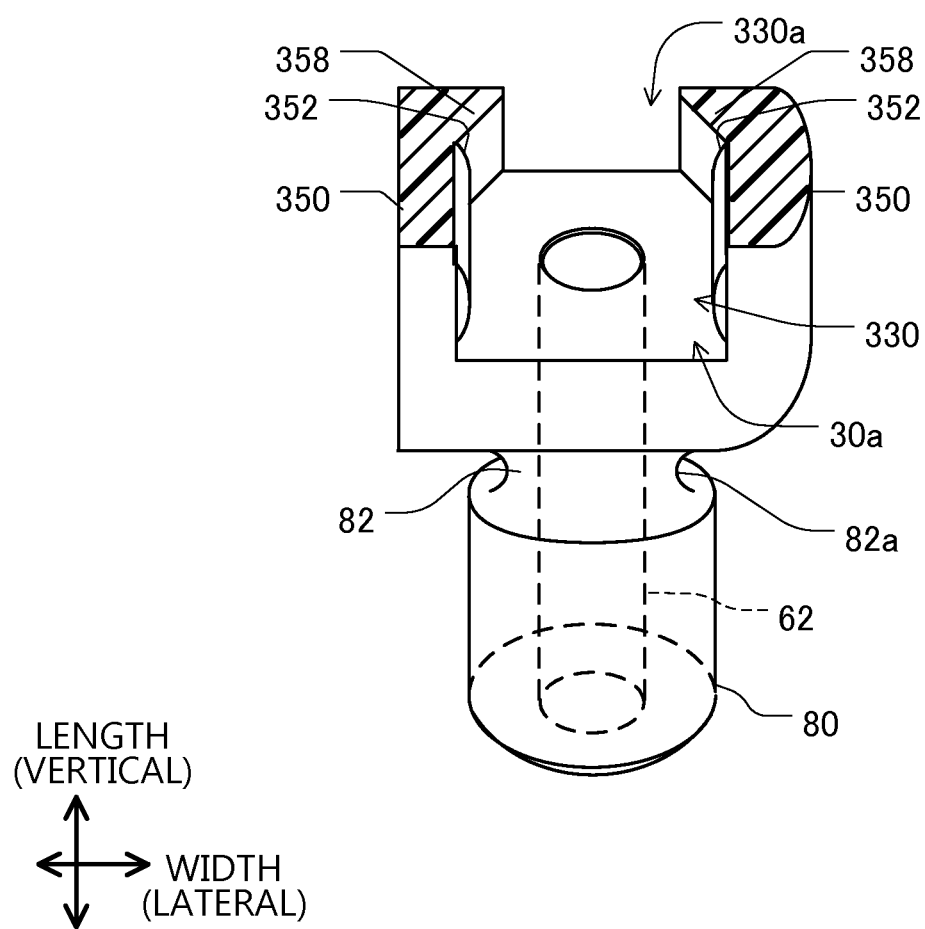
FIG. 11 is a partial sectional perspective view showing a pocket of a third embodiment.

As shown in FIG. 11, in the present example, sidewalls 350 may be reduced from its intermediate portion toward an opening 330a. The sidewalls 350 form stoppers 358 around the opening 330a. The stoppers 358 may define surfaces, which are along adjacent two nut surfaces 10a when the nut 10 is fitted in a pocket 330, and when the adjacent two nut surfaces 10a are in contact with the stoppers 358.

Fourth Embodiment

Figure 12:
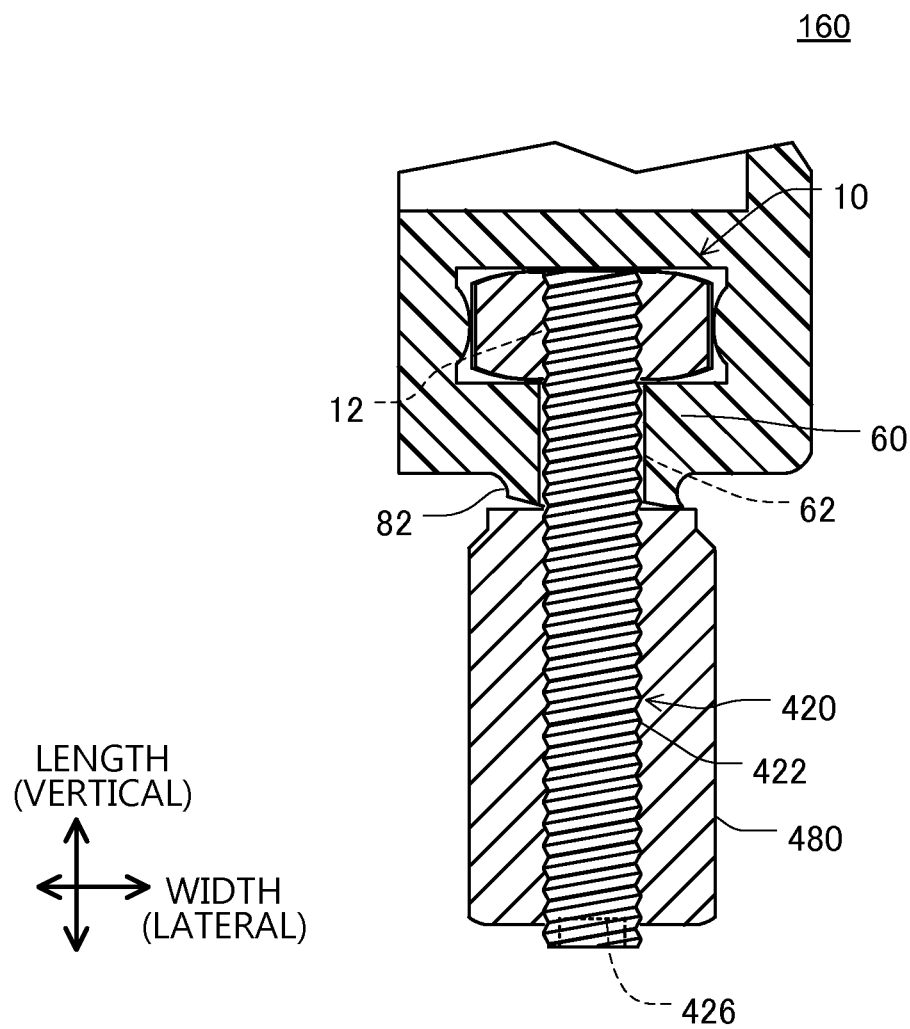
FIG. 12 is a partial sectional view showing a bolt and a substitute pin of a fourth embodiment.

As shown in FIG. 12, in the present example, a bolt 420 may be a stud bolt having a hex key 426 at one end. The bolt 420 may be screwed into the through hole 62 of the and the center thread of the nut 10. An additional substitute pin 480 may be further screwed to the one end of the stud bolt 420. The substitute pin 480 may be formed of metal and/or resin in a tubular shape. The substitute pin 480 may function as a substitute of the pin 80. The substitute pin 480 may be omitted. In this case, the body of the stud bolt 420 may function as a substitute of the pin 80.

Other Embodiment

At least one of an upper side and a bottom side of tanks and may have the pocket and the pin.

The nut is not limited to the hexagonal nut and may employ various shapes having female thread to receive a screw. The bolt is not limited to the hex-key bolt and may employ various forms such as a hexagonal head bolt.

At least one of the side surfaces may not have a protrusion and may have a flat surface.

The wordings of the top, the upper, the bottom, and the lower may not necessarily represent an upper side and a lower side relative to a gravitational direction. The relationship of the top, the upper, the bottom, and the lower may change in dependence upon installation of the heat exchanger.

For purposes of clarity, the same reference numbers will be used in the drawings to identify similar elements. As used herein, the phrase at least one of A, B, and C should be construed to mean a logical (A or B or C), using a non-exclusive logical or.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A heat exchanger that is fixed to a frame of a vehicle through a bracket, the heat exchanger comprising:
a tank that has a bottom wall;
a breakable pin that protrudes from the bottom wall along a first direction, the breakable pin configured to be inserted into a hole formed in the bracket;
a pocket defined by the tank, the pocket has an opening in a second direction perpendicular to the first direction; and
a through hole defined by the breakable pin and the bottom wall, the through hole extending along a longitudinal axis of the breakable pin, through the bottom wall, and to the pocket in the first direction;
wherein the pocket is aligned with the breakable pin along the first direction and is configured to receive a nut therein through the opening, and
wherein the breakable pin is configured to be fractured from the bottom wall when a predetermined stress is exerted onto the breakable pin.

2. The heat exchanger according to claim 1, wherein
the tank includes a first side wall and a second side wall that face each other along a third direction perpendicular to both the first and second directions,
the first side wall includes a first protrusion and the second side wall includes a second protrusion,
the nut has a width along the third direction, and
the first protrusion and the second side protrusion have a distance therebetween along the third direction that is equal to or less than the width of the nut.

3. The heat exchanger according to claim 2, wherein
the first protrusion has an arc shaped cross-section, and
the second protrusion has an arc shaped cross-section.

4. The heat exchanger according to claim 1, wherein
the breakable pin includes a notch that is formed along a circumferential surface of the breakable pin.

5. A heat exchanger that is fixed to a frame of a vehicle through a bracket, the heat exchanger comprising:
a tank that has a bottom wall and defines a pocket having an opening in a second direction;
a root extending from the bottom wall on a side of the bottom wall opposite to the pocket, the root having an edge at an end of the root opposite to the bottom wall;
a through hole defined by the root and the bottom wall, the through hole extending along a longitudinal axis of the root, through the bottom wall, and to the pocket in a first direction that is perpendicular to the second direction;
a bolt extending through the through hole defined by the root and the bottom wall along the longitudinal axis of the through hole and into the pocket; and
a nut seated inside the pocket through the opening and fastened to the bolt, the bolt is screwed into the nut from an insertion opening of the through hole that is exposed at the edge of the root.

6. The heat exchanger according to claim 5, wherein
the tank includes a first side wall and a second side wall that face each other along a third direction perpendicular to both the first and second directions,
the first side wall includes a first protrusion and the second side wall includes a second protrusion,
the nut has a width along the third direction, and
the first protrusion and the second side protrusion have a distance therebetween along the third direction that is equal to or less than the width of the nut.

7. The heat exchanger according to claim 6, wherein
the first protrusion has an arc shaped cross-section, and
the second protrusion has an arc shaped cross-section.

* * * * *